July 6, 1948.  W. H. BUSSEY  2,444,726
METHOD AND APPARATUS FOR DETERMINING
THE MAGNITUDE OF A CONDITION
Filed Feb. 5, 1944
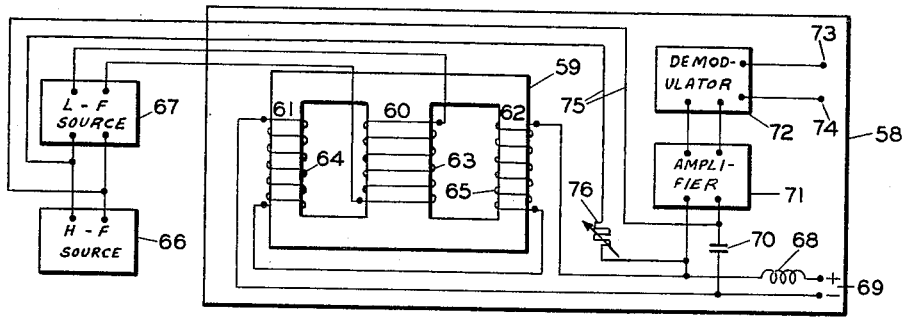
FIG. 3
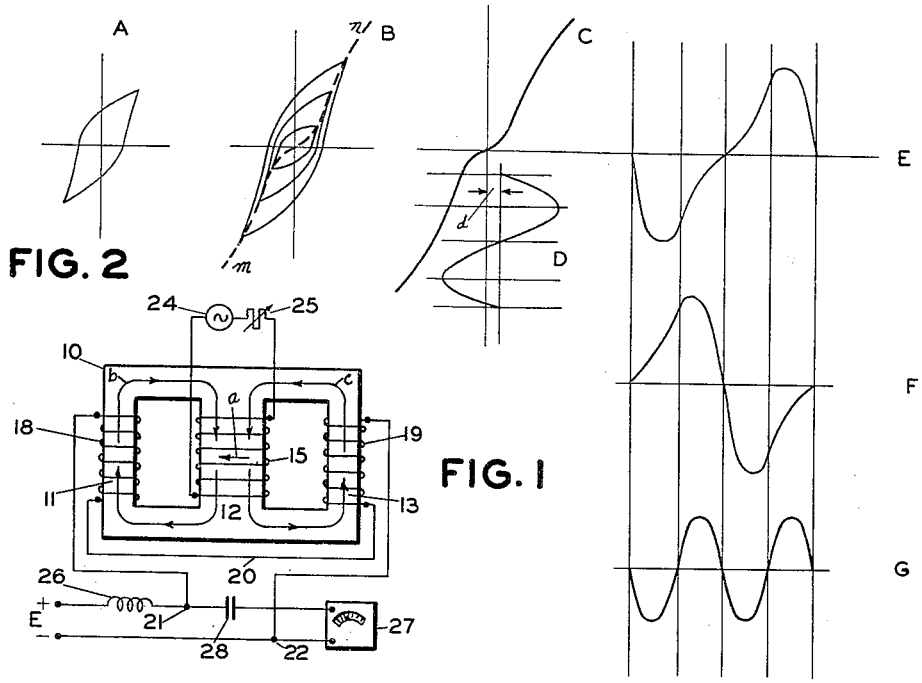
FIG. 2
FIG. 1
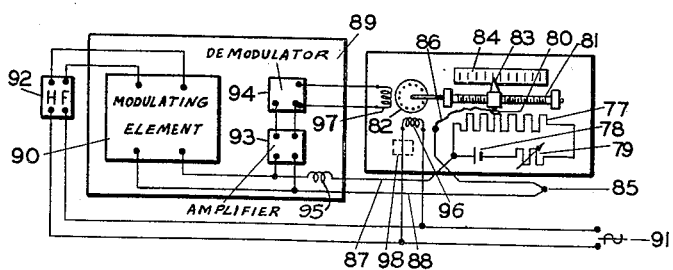
FIG. 4
INVENTOR.
WILLIAM H BUSSEY
BY
E. C. Sanborn
Attorney Patented July 6, 1948

2,444,726

UNITED STATES PATENT OFFICE 2,444,726

METHOD AND APPARATUS FOR DETERMINING THE MAGNITUDE OF A CONDITION

William H. Bussey, Chicago, Ill., assignor to The Bristol Company, Waterbury, Conn., a corporation of Connecticut Application February 5, 1944, Serial No. 521,236

7 Claims. (Cl. 323—89)

This invention relates to a method and apparatus for determining the magnitude of a condition, and more especially to a method and apparatus whereby a very small change in the value of a direct current may be caused to control the magnitude of a relatively large alternating-current effect. In the measurement by electrical means of quantities not in themselves of an electrical nature, such as temperature and certain chemical effects, the magnitude under measurement is frequently represented by a unidirectional electromotive force whose changes are representative of variations in said magnitude. In the performance of such measurements, especially where relatively small amounts of electrical energy are available, it frequently becomes desirable to amplify variations for the purpose of providing useful indications, records, and control functions. It is a recognized fact that, while unidirectional effects may be amplified by means of electron tube systems, such methods of amplification are subject to many drawbacks and generally may not be performed with the facility which characterizes the amplifications of alternating current magnitudes.

It is an object of this invention to provide means whereby very small changes in the value of a unidirectional current effect may be caused to produce corresponding changes in an alternating current effect whereby the latter may be amplified and utilized in the performance of functions beyond the scope of the power level represented by the original unidirectional current variations. In accomplishing the purposes of the invention, it is proposed to utilize the principle of the induction balance and to make said balance sensitive to changes in the magnetic condition of a portion of its magnetic circuit as affected by the degree of magnetization of said portion resulting from the combination of a controllable variable influence and the independently variable influence under investigation.

The induction balance, as developed and applied by Professor D. E. Hughes (see Ganot's Physics, 15th ed., Wood & Co., N. Y., 1898, Art. 962) comprises a form of air-cored transformer having two opposed identical secondary windings magnetically linked with a common primary winding, but not having their magnetic circuits wholly in common. Thus, while the secondary windings are normally adjusted to exact opposition, with a consequent zero value of resultant electromotive force in the output circuit, any disturbance of the field associated with only one of the secondary coils, as by the introduction of a small piece of magnetic material or of a piece of conducting material in which eddy-currents may be induced, will bring about a condition of unbalance, with a consequent alternating current electromotive force appearing at the secondary terminals.

While the Hughes induction balance is essentially an air-cored transformer, its principle is equally applicable to an electromagnetic system having cores formed of iron or similar ferromagnetic material. When the principle is applied to such structures, the sensitivity is of course greatly increased, and extremely small changes in the relative reluctance of the magnetic paths of the respective secondary windings will produce large unbalance effects with corresponding values of secondary output potentials. The reluctance of such a magnetic system can be effectively varied by any influence which will act to change the permeability of the portion of the magnetic circuit which links with one of the secondary coils without correspondingly changing that of the portion which links with the other.

It is a well-known fact that the permeability of practically all ferromagnetic materials varies according to the degree of magnetization; and the responsiveness of a magnetic circuit to alternating magnetization may be controlled by the degree of unidirectional magnetization. If there be incorporated in the magnetic circuit which is linked with at least one of the secondary windings of an induction balance a portion of ferromagnetic material whose permeability may be varied by the influence of a superimposed magnetizing force, changes in the values of this force may be utilized to affect the balance of the system. The effect may be materially increased if the structure be such as to include such ferromagnetic material in the magnetic circuits of both the secondary coils and to utilize the superimposed magnetizing effect in a manner to affect the permeabilities of the sensitive portions of said magnetic circuits in opposite senses.

The induction modulator incorporating the principle of the invention may be considered as a symmetrical three-legged transformer having a primary winding on the central leg and two identical coils on the outside legs to form a secondary winding. The secondary coils are connected in a sense of opposition with respect to electromotive forces induced by flux developed in the associated portions of the core due to magnetizing current in the primary winding, so that, so long as the components of flux in those portions of the magnetic circuit are equal, the opposed outputs of the secondary coils will mutually annul.

The functioning of the induction balance as herein described is based upon the utilization of a relatively small unidirectional magneto-motive force derived from a unidirectional current influence to be investigated in such a manner that the ferro-magnetic portions associated with the two secondary coils will be affected in opposite senses, so that, while the inductive characteristics of the one become greater, those of the other become correspondingly less, than the normal value with the result that the electromotive forces set up in said secondary coils and opposed in the associated connections will no longer be equal in value, and will consequently have a resultant whose magnitude may be taken as representative of that of the biasing influence.

The non-linear nature of the relationships involved renders impracticable any exact mathematical statements as to the actual performance of ferromagnetic systems involving simultaneous alternating and unidirectional magnetization; but investigation of the phenomena existing in such systems leads to certain dependable generalizations which serve to explain the observed phenomena. While attempts at analysis of phenomena based on these generalizations are likely to be misleading and controversial, I have found that their utilization is practicable; and for a further disclosure of the invention, in which these principles have been demonstrated by tests, including oscillographic observation, and actual operation of a self-balancing potentiometric recorder, reference may be had to the ensuing description and the accompanying drawings.

In the drawings:

Fig. 1 is a diagrammatic representation of an embodiment of the invention in an elementary form.

Fig. 2 is a graphic representation of certain variable magnitudes whose relative values bear upon the performance of apparatus embodying the principles of the invention.

Fig. 3 is a diagrammatic representation of the invention in a form modified from that shown in Fig. 1.

Fig. 4 is a diagram showing the application of the invention to the operation of a self-balancing potentiometer.

Referring now to the drawings:

In Fig. 1 is shown an embodiment of the invention in a simplified form. A core structure 10 is formed of ferromagnetic material having at low values of induction both a high permeability and a high rate of change of permeability with variation in induction. Such materials are well known. The core structure 10 is provided with three legs or core portions 11, 12, and 13, suitably connected by yoke portions disposed as shown in the drawing to form two complete magnetic circuits having the portion 12 in common and the portions 11 and 13 constituting parallel and structurally identical paths for flux developed by magnetomotive force originating in the portion 12. The portions 11 and 13 may hereinafter be referred to as the "outside" legs or core portions, and the portion 12 as the "middle" leg, or core portion, of the magnetic circuit; and the latter is preferably constructed to have a section area approximately double that of the outside legs whereby all active parts of the magnetic circuit will operate at a substantially common permeability value so far as the latter may be influenced by magnetizing force developed in the middle leg 12. Since the function of the invention is essentially dependent upon the slope and curvature of the magnetization curve of the core material, it is important that any influence which might tend to obscure this characteristic be avoided. It is therefore desirable that the magnetic circuit be composed entirely of ferromagnetic material, and that no air gaps exist in the path of the flux.

Wound upon the middle leg 12 of the core structure is an insulated coil 15, adapted when excited by a suitable electric current to develop in the leg 12 a magnetomotive force tending to produce a flux which will divide and establish parallel return paths through the outside legs 11 and 13. For example, if direct current be passed through the coil 15 in a direction indicated by the arrow $a$ there will be established in the magnetic circuit a flux whose relative directions in the legs 11 and 13 will be as indicated by the arrows $b$ and $c$ respectively. If, instead, an alternating current be passed through the coil 15, the directions of $a$, $b$, and $c$ will be reversed every half cycle.

Wound upon the outside legs or portions 11 and 13 respectively, of the core structure are two mutually identical coils 18 and 19 interconnected by a conductor 20 and having their free ends brought to terminals 21 and 22, the relative polarity of said coils being made such that a current flowing through the same between the terminals 21 and 22 will tend to magnetize the core portions 11 and 13 in opposite senses. Thus, during one half-cycle of alternating current, the magnetic effect of a unidirectional current flowing through the winding composed of the coils 18 and 19 will be to reinforce the flux in one of said outside legs and to oppose the flux in the other, with said effect being interchanged in the succeeding half-cycle.

For purposes of operation of the invention in the form shown in Fig. 1, the winding 15 is connected to an alternating current source 24, having in series therewith a rheostat 25 whereby the value of current flowing in said winding may be adjusted to a suitable value. From a source E is derived a unidirectional electromotive force whose value is to be investigated, and said electromotive force is applied in series with an inductive choke 26 to the output terminals 21 and 22. Across the terminals 21 and 22 is also connected an instrument 27 suitable to the determination of alternating current potentials, and in series with this instrument is connected a capacitor 28. The choke 26 and the capacitor 28 serve to segregate the alternating and the unidirectional components of the current flowing in the winding made up of the coils 18 and 19, so that direct current is prevented from flowing through the instrument 27, and, at the same time, the alternating component of current which may flow through the source E is reduced to negligible magnitude.

For an understanding of the operating principles of the invention it may first be assumed that the winding 15 is connected to the alternating current source 24 and that by means of the rheostat 25 the alternating current flowing therein is adjusted to a suitable value. There will thus be established in the core a condition of cyclical magnetization as represented by the hysteresis loop shown at A in Fig. 2, which curve may be taken as typical of a ferromagnetic material after having been carried through a sufficient number of cycles to eliminate residual effects and produce a closed figure. This curve is symmetrical about the origin for equal positive and negative peak amplitudes. At B in Fig. 2 is shown a family of such loops working from a common origin but having different peak amplitudes. The locus of the tips of the hysteresis loops, indicated by the dotted line m—n, is known as the "normal magnetization curve."

In order better to understand the operation of the device, it may be assumed that core conditions are fully expressed by the normal magnetization curve for the particular material used. With this assumption, and with alternating current flowing in the winding 15, said current being maintained of a substantially sinusoidal wave form by virtue of the resistance value of the rheostat 25 being made high in relation to the inductive impedance of the winding 15, there may be developed a graph of flux in the magnetic circuit by projecting the curve of current (magnetizing force) against the normal magnetization curve. This method of determining derived wave forms is common in investigations of the characteristics of vacuum tubes, and is used to a lesser degree in studies of electromagnetic systems. Its basic application is shown in the book "Electromagnetic Devices," H. C. Roters (Wiley 1941) page 420, Fig. 1, the variables in this instance both being of a sinusoidal characteristic and the magnetization curve being assumed as linear. Where the magnetization curve departs from a substantially linear form it is of course impossible for both the related variables to have a common wave form, and with a sinusoidal magnetizing current, the flux density curve will follow a law which can be expressed only by a comparatively intricate series. For purposes of simplicity, this element has been omitted from the graphical representation in Fig. 2. At C in Fig. 2 is shown the normal magnetization curve, the method of whose derivation has been indicated at B, and related to said curve is a sinusoidal magnetizing force D, displaced from the axis of symmetry of the magnetization curve by a distance d, which represents the effect of a direct current component derived from the source E, and flowing in the winding 15.

By projecting said displaced magnetizing force curve D upon the magnetization curve C, according to the hereinbefore mentioned well known method, and computing the derived voltage on a basis of rate of change of the flux curve, there will be obtained a wave of the general nature shown at E in Fig. 2, as representing the electromotive force set up in the winding upon one of the outside legs of the core structure. Similarly, a voltage of substantially the same wave form, but displaced therefrom in time-phase relationship, as shown at F, will be induced in the winding on the other of the two outside legs of the core. Even with the magnetizing influence D following a sinusoidal law, the actual shape of the induced voltage waves E and F will be subject to considerable variation, due to the form of the magnetization curve of the iron, and to the magnitude of the magnetizing influence, but the general statement may be made that the form of these waves will be characterized by a pronounced double-frequency component with respect to the fundamental frequency of the wave D.

As the output coils 18 and 19, wound upon the outside legs 11 and 13 respectively of the core structure are connected with such relative polarity that alternating voltages induced therein are mutually opposed, the electromotive force appearing at the terminals of the output winding may be determined by opposing the waves E and F, under which condition the fundamental component will disappear, leaving a double-frequency resultant as indicated at G in Fig. 2.

By mathematical analysis it can be demonstrated that, so long as the superimposed magnetizing influence is wholly unidirectional in its nature, the net output will be characterized only by even harmonics of the fundamental frequency. It will be apparent by inspection, moreover, that the double-frequency output voltage will vary in magnitude both with the alternating and the unidirectional input voltages, and that a reversal of polarity of the unidirectional magnetizing current will produce a phase-shift of 180 electrical degrees in the output electromotive force.

Where the magnitude only of the unidirectional electromotive force at the source E is of interest, the double frequency output between the terminals 21 and 22, as quantitatively determined by means of the instrument 27 will provide a measure representative of this magnitude; and this measure may be expressed either as an indication or as a graphic record.

While the form of the invention as thus far described is operative to the extent of providing an indication or a record of the unidirectional magnitude under investigation, the scope of application of the principle of the invention may be greatly widened by the adaptation of a modified form presently to be described. The advantages accruing to the improved form may be summarized as follows: (1) Ease of amplifying the output voltage. (2) The preservation in the output voltage of a fundamental frequency component variable in amplitude and phase position with the magnitude and polarity of the unidirectional potential under investigation. (3) The elimination of effects due to alternating electromotive forces of fundamental frequency inductively picked up by the measuring circuit.

In the improved form of the invention, the alternating excitation, instead of being derived from a single A.-C. source, is obtained from a source combining two widely different frequencies interconnected to superimpose their magnetizing effects in the core structure. With two such frequencies so superimposed, and in suitable proportion, it may be assumed that, while normal processes of electromagnetic induction attend the periodic variation of one of the flux components, causing corresponding alternating E. M. F.'s to be induced in windings linked therewith, the other component of flux variation causes the magnetic condition in each of the outside legs periodically to traverse a range of values corresponding to the variation in instantaneous values of flux density in said legs. Actually, of course, each of the different frequency components is attended by both phenomena, and it cannot be said that, beyond such influence as actual frequency and magnitude of the magnetizing forces may have on induction and saturation phenomena, either of the components has a predominant effect. In analyzing the performance of the device where the dual frequency excitation is present, it has, however, been found expedient to consider the effect of the higher frequency as being restricted to the mechanism of electromagnetic induction, and that of the lower frequency as providing a "sweep" (or "scanning") influence, whereby the magnetic condition in each of the outside legs of the core structure is periodically carried through a predetermined range of values corresponding to points on the normal magnetization curve of the ferromagnetic material.

In Fig. 3 is shown a unit 58 incorporating the principle of the invention in its preferred form, and including a ferromagnetic core structure 59 substantially identical with that shown in Fig. 1, having a middle leg 60 and outside legs 61 and 62, said legs being provided with suitable windings comprising a coil 63 on the leg 60 and mutually identical coils 64 and 65 on the legs 61 and 62 respectively. The coils 64 and 65 are interconnected with their relative polarity such that current flowing through them in series will tend to magnetize the core portions 61 and 62 in opposite senses. The free ends of the winding composed of the coils 64 and 65 are connected through an inductive choke 68 to terminals 69, to which may be applied a unidirectional potential to be investigated and also through a capacitor 70, which effectually bars the flow of direct current, to an amplifier 71 tuned to characteristics presently to be set forth, and thence to a demodulating unit 72 having output terminals 73 and 74.

The coil 63 is supplied with exciting current from two interconnected alternating current sources 66 and 67, producing alternating currents of high and low frequencies respectively, these currents being superimposed in the winding 63 to combine their magnetizing influences on the associated magnetic system. With the fundamental or lower frequency of the order of 60 cycles per second, it has been found that effective operation of the apparatus is obtained when the higher frequency lies in the "audio" range of which a value of 1650 cycles per second may be taken as an example; and it has been found by practical test that best results are obtained if the amplitude of the low frequency component of the voltage be made relatively small with respect to that of the high. The invention does not, however, exclude the use of frequencies higher than those of the "audio" range. The tuning of the amplifier 71 is made such that it will pass a band of frequencies ranging from the sum to the difference of those derived from the sources 66 and 67.

It may be shown that when the two frequency components (designated as $f_1$ and $f_2$ respectively) are superimposed in an electromagnetic system as hereinbefore described, and a unidirectional unbalancing influence introduced, there will appear in the output voltage components having a number of different frequencies, among which will be those having value of $(f_2+f_1)$ and $(f_2-f_1)$. If there be added to these a third component having a frequency $f_2$, the resultant voltage may be considered as a modulated wave, from which the component having the frequency $f_1$ may be recovered by the use of any one of a number of suitable demodulating networks well-known in communication practice. By virtue of the frequency component $f_2$, acting as a carrier wave, and having a much higher frequency than the fundamental $f_1$, it follows that amplification can be effected to any desired degree with correspondingly greater ease than could be done were the high-frequency component not present.

The circuit of Fig. 3, as thus far described makes no provision for the introduction of the $f_2$ component into the output voltage. However, it has been found in practice that a satisfactory output may be obtained without a separate supply for the component having the frequency $f_2$. Should it for any cause be desirable to provide a separate supply for that component, it can be introduced into the output by means of a circuit 75 as shown in Fig. 3, deriving from the high frequency source 66 a component having the frequency $f_2$, and superimposing it through a suitable rheostat 76 upon the output voltage of the induction apparatus.

While it has been thought desirable to eliminate involved mathematical analyses from the present discussion, the methods by which appropriate computations may be carried out are well-known in the art; and from these may be derived the following two outstanding facts: (1) The component of the output voltage having the fundamental frequency $f_1$ will vary in phase position with the direction of the unidirectional unbalancing influence, and in amplitude with the quantitative value of said influence. (2) A fundamental frequency component in the circuit of the unidirectional unbalancing influence (such as might be inductively introduced into a thermocouple circuit) will not reappear in the output potential.

Since apparatus as shown in Fig. 3 will provide an alternating current output having fundamental frequency, and variable in phase position and amplitude with the direction and magnitude of the unidirectional current input, said output may be directly applied in the operation of mechanism for automatically balancing an electrical network such as a bridge or a potentiometer; and in Fig. 4 is shown an application of the principle to a self-balancing potentiometer adapted to the purpose of pyrometry by providing a continuous measure of the electromotive force developed in a thermocouple exposed to a temperature to be measured. A slide-wire 77 carrying a constant current derived from a battery 78 and adjusted to a suitable predetermined value by means of a rheostat 79 is adapted to be traversed by a sliding contact 80 positioned by means of a lead screw 81 which may be driven in either direction by a reversible electric motor 82. An index or pointer 83 in cooperation with a graduated scale 84 provides a measure of the position of the sliding contact 80 with respect to the slide-wire 77. A thermocouple 85 is exposed to the temperature to be measured, and one end of said couple is connected by means of a flexible lead 86 to the sliding contact 80. To the left-hand end of the slide-wire 77 as seen in the drawing is connected a conductor 87, and to the free end of the thermocouple 85 is connected a conductor 88.

An electromagnetic unit 89 similar in all respects to the hereinbefore described unit 58 shown in Fig. 3 includes a modulating element 90 (corresponding to element 59) and is provided with a source 91 of low frequency current and a source 92 of high frequency current, whereby there may be derived the dual excitation fully described in connection with the apparatus shown in Fig. 3. The secondary output circuit of the element 90 is provided with an amplifier 93 and a demodulator 94; and the unidirectional current input terminals of the unit 90 are connected in series with a suitable inductive choke 95 to the conductors 87 and 88, and thereby included in the potentiometer circuit.

The motor 82 is preferably of the two-phase type, having two mutually displaced windings 96 and 97. The winding 96 is continuously excited from the source 91, whereby there is provided an alternating field in the motor. If desired, there may be placed in series with the winding 96 and the source 91 a capacitor or other phase-shifting device 98, whereby the phase position of the field developed by the winding 96 may be most advantageously located. The winding 97 is connected to the output terminals of the demodulator 94, and will thus, as hereinbefore set forth, receive an alternating current whose magnitude and phase position will vary in response to changes in the electromotive force derived from the conductors 87 and 88.

The operation of the self-balancing potentiometer is as follows. Assuming first a condition of balance between the E. M. F. derived from the thermocouple 85 and that corresponding to the position of the sliding contact 80 on the slide-wire 77, there will be no unidirectional potential existing between the conductors 87 and 88, with the result that there will be no alternating current potential of fundamental frequency derived from the output terminals of the demodulator 94. The motor 82, having only the winding 96 excited, and no current of corresponding frequency flowing in the winding 97, will remain locked in a position of rest.

It may now be assumed that the temperature at which the thermocouple 85 is exposed has changed, so that there no longer exists a condition of balance between the thermocouple E. M. F. and that corresponding to the position of the sliding contact 80 on the slide-wire 77. The differential electromotive force appearing between the conductors 87 and 88 will be applied to the secondary windings of the modulating element 90, and, in the manner hereinbefore set forth, will cause an alternating electromotive force corresponding in frequency to that of the source 91, and dependent in magnitude and phase position upon the magnitude and polarity of the unbalanced electromotive force, to appear at the output terminals of the demodulator 94, and to be applied to the winding 97 of the motor 82. The motor 82 will rotate in a direction and with a velocity depending upon the phase position and intensity of the current in the winding 97, and, by proper selection of relative polarities, will cause the sliding-contact 80 to be moved along the slide-wire 77 in a sense to reduce the unbalance existing between the slide-wire potential and the thermocouple voltage. As a condition of balance is approached, the current flowing in the winding 97 will become progressively less, so that the motor will operate more slowly, until it comes to rest with a condition of balance re-established. Thus the sliding contact 80 will continuously seek a position corresponding to the value of the electromotive force developed in the thermocouple 85; and this position, as exhibited by the relation of the index or pointer 83 to the graduated scale 84 will be a measure of the temperature to which the thermocouple 85 is exposed.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A method of determining the magnitude of a condition, comprising producing alternating magnetic fields linked with the secondary windings of an induction balance by applying concurrently to the primary winding of said balance alternating electromotive forces of substantially different basic frequencies, superimposing upon a portion of the magnetic circuit of one of said secondary windings a magnetizing force derived from a unidirectional current the magnitude of which varies with that of said condition, deriving from said secondary windings an output voltage including components having frequencies equal to the sum and to the difference of those of said alternating electromotive forces, and demodulating said voltage to recover therefrom a component having the lower of said basic frequencies.

2. A method of determining the magnitude of a condition, comprising producing alternating magnetic fields linked with the secondary windings of an induction balance by applying concurrently to the primary winding of said balance alternating electromotive forces of substantially different basic frequencies, superimposing upon a portion of the magnetic circuit of one of said secondary windings a magnetizing force derived from a unidirectional current the magnitude of which varies with that of said condition, deriving from said secondary windings an output voltage including components having frequencies equal to the sum and to the difference of those of said alternating electromotive forces, amplifying said output voltage, and demodulating said voltage to recover therefrom a component having the lower of said basic frequencies.

3. Apparatus for determining the magnitude of a condition, comprising a core structure of ferromagnetic material having a plurality of leg portions connected by yoke portions, means for applying concurrently to one of said leg portions alternating electromotive forces of substantially different frequencies, opposed secondary windings around others of said leg portions, means for superimposing upon a portion of the magnetic circuit of one of said secondary windings a magnetizing force derived from a unidirectional current the magnitude of which varies with that of said condition, and means for recovering from the output voltage of said secondary windings a component having the lower of said frequencies and of a magnitude and phase position corresponding respectively with the magnitude and direction of said unidirectional current.

4. Apparatus for determining the magnitude of a condition, comprising a core structure of ferromagnetic material having a plurality of leg portions connected by yoke portions, means for applying concurrently to one of said leg portions alternating electromotive forces of substantially different frequencies, opposed secondary windings around others of said leg portions, means for superimposing upon a portion of the magnetic circuit of one of said secondary windings a magnetizing force derived from a unidirectional current the magnitude of which varies with that of said condition, said apparatus being so arranged as to introduce into the output voltage of said secondary windings a voltage component having the higher of said frequencies, and means for demodulating said output voltage to recover therefrom a component having the lower of said frequencies.

5. Apparatus for determining the magnitude of a condition, comprising a core structure of ferro-magnetic material having a plurality of leg portions connected by yoke portions, means for applying concurrently to one of said leg portions alternating electromotive forces of substantially different frequencies, opposed secondary windings around others of said leg portions, means for superimposing upon a portion of the magnetic circuit of one of said secondary windings a magnetizing force derived from a unidirectional current the magnitude of which varies with that of said condition, said apparatus being so arranged as to introduce into the output voltage of said secondary windings a voltage component having the higher of said frequencies, means for amplifying said output voltage, and means for demodulating said output voltage to recover therefrom a component having the lower of said frequencies.

6. Potentiometer balancing apparatus comprising an electric motor, electric circuit means controlled by said motor to effect a balance between a given unidirectional electromotive force and another unidirectional electromotive force corresponding in magnitude to the magnitude of a condition, a core structure of ferro-magnetic material having a plurality of leg portions connected by yoke portions, means for applying concurrently to one of said leg portions alternating electromotive forces of substantially different frequencies, opposed secondary windings around others of said leg portions, means for superimposing upon a portion of the magnetic circuit of one of said secondary windings a magnetizing force derived from a unidirectional current the magnitude of which varies with that of said condition, said apparatus being so arranged as to introduce into the output voltage of said secondary windings a voltage component having the higher of said frequencies, means for demodulating said output voltage to recover therefrom a component having the lower of said frequencies, and means for applying said recovered component to the control of said motor.

7. Apparatus for balancing an electrical network, comprising a core structure of ferro-magnetic material constituting a magnetic circuit and having a plurality of leg portions connected by yoke portions, means for applying concurrently to one of said leg portions independent alternating magnetizing forces of substantially different frequencies, secondary winding means differentially responsive to flux in other of said leg portions, means for introducing into said magnetic circuit a magnetizing force derived from a unidirectional current the magnitude of which varies with the extent of unbalance of said network, means for recovering from the output voltage of said secondary winding means a component having the lower of said frequencies and of a magnitude and phase position corresponding respectively with the magnitude and direction of said unidirectional current, and means for applying said component to the balancing of said network.

WILLIAM H. BUSSEY.

REFERENCES CITED

The following references are of record in the file of this patent:

UNITED STATES PATENTS

| Number | Name | Date |
| --- | --- | --- |
| 1,412,853 | Espenschied | Apr. 18, 1922 |
| 1,412,908 | Van Dyke | Apr. 18, 1922 |
| 1,995,530 | Asky | Mar. 26, 1935 |
| 1,997,657 | Schumutz | Apr. 16, 1935 |
| 2,053,154 | Pierre | Sept. 1, 1936 |
| 2,039,405 | Green | May 5, 1936 |
| 2,209,369 | Wills | July 30, 1940 |
| 2,222,049 | Stevens et al. | Nov. 19, 1940 |
| 2,247,983 | Barth | July 1, 1941 |
| 2,259,711 | Stevens et al. | Oct. 21, 1941 |
| 2,300,742 | Harrison | Nov. 3, 1942 |

FOREIGN PATENTS

| Number | Country | Date |
| --- | --- | --- |
| 501,431 | France | Jan. 26, 1920 |